United States Patent
Ho et al.

(10) Patent No.: US 11,287,898 B2
(45) Date of Patent: Mar. 29, 2022

(54) BACKLIGHT MODULE AND ILLUMINATED KEYBOARD

(71) Applicant: Chicony Power Technology Co., Ltd., New Taipei (TW)

(72) Inventors: Hsuan-Wei Ho, New Taipei (TW); Yi-Ching Wu, New Taipei (TW)

(73) Assignee: Chicony Power Technology Co., Ltd., New Taipei (TW)

( * ) Notice: Subject to any disclaimer, the term of this patent is extended or adjusted under 35 U.S.C. 154(b) by 0 days.

(21) Appl. No.: 17/111,481

(22) Filed: Dec. 3, 2020

(65) Prior Publication Data

US 2022/0026994 A1    Jan. 27, 2022

(30) Foreign Application Priority Data

Jul. 21, 2020    (TW) .................................. 109124645

(51) Int. Cl.
*G06F 3/02* (2006.01)
*H01H 13/83* (2006.01)
*F21V 8/00* (2006.01)

(52) U.S. Cl.
CPC .......... *G06F 3/0202* (2013.01); *H01H 13/83* (2013.01); *G02B 6/0011* (2013.01)

(58) Field of Classification Search
None
See application file for complete search history.

(56) References Cited

U.S. PATENT DOCUMENTS

| 2014/0092034 | A1  | 4/2014  | Franklin et al. |
| 2015/0109757 | A1* | 4/2015  | Chen ...................... H01H 3/125 362/23.03 |
| 2015/0198302 | A1* | 7/2015  | Liang ...................... H01H 9/182 362/23.03 |
| 2018/0301299 | A1  | 10/2018 | Lin |
| 2019/0172663 | A1* | 6/2019  | Yeh ........................ H01H 3/125 |
| 2020/0043681 | A1* | 2/2020  | Chen ..................... G02B 6/0036 |

FOREIGN PATENT DOCUMENTS

| CN | 101122715 A | 2/2008 |
| CN | 103150027 A | 6/2013 |
| CN | 203617189 U | 5/2014 |
| CN | 104992869 B | 5/2016 |
| CN | 205564608 U | 9/2016 |

(Continued)

*Primary Examiner* — Kirk W Hermann
(74) *Attorney, Agent, or Firm* — CKC & Partners Co., LLC

(57) ABSTRACT

A backlight module includes a light-shielding sheet, a light guide plate under the light-shielding sheet, a reflective sheet under the light guide plate, a main circuit board under the reflective sheet, a light-emitting unit on the main circuit board, a flexible circuit board under the reflective sheet, and an electrical connector electrically connected to the flexible circuit board and the main circuit board. A protrusion of the reflective sheet protrudes into a through hole of the light guide plate. The light-emitting unit passes through an opening of the reflective sheet to be accommodated in a slot hole of the light guide plate. The light-emitting unit is configured to emit light to reach a light exit area of the light-shielding sheet through the light guide plate. The electrical connector is aligned with the through hole or further protrudes into the through hole.

15 Claims, 4 Drawing Sheets

(56) References Cited

FOREIGN PATENT DOCUMENTS

| | | |
|---|---|---|
| CN | 104576145 B | 6/2017 |
| CN | 107768171 A | 3/2018 |
| TW | M476973 U | 4/2014 |
| TW | M517404 U | 2/2016 |
| TW | M519764 U | 4/2016 |
| TW | I652711 B | 3/2019 |
| TW | 201926392 A | 7/2019 |
| TW | 201933404 A | 8/2019 |
| TW | I677000 B | 11/2019 |
| TW | I688978 B | 3/2020 |

\* cited by examiner

BACKLIGHT MODULE AND ILLUMINATED KEYBOARD

CROSS-REFERENCE TO RELATED APPLICATION

This application claims priority to Taiwan Application Serial Number 109124645, filed Jul. 21, 2020, which is herein incorporated by reference.

BACKGROUND

Technical Field

The present disclosure relates to a backlight module and an illuminated keyboard.

Description of Related Art

Appearances of traditional keyboards are usually dull and rigid, so manufacturers of computer peripheral devices have developed illuminated keyboards with excellent visual effects. The illuminated keyboards have backlight modules. In conventional backlight modules, embodiments of light-emitting circuit boards can be mainly divided into two types, one is a flexible material circuit board structure, and the other is a rigid material circuit board structure.

The flexible material circuit board structure includes a circuit board body and a flexible circuit strip that are integrally formed. Light sources are disposed on the circuit board body. The flexible circuit strip is connected to a power source to transmit power to the circuit board body. The light-emitting diode receiving the power can emit light from the inside of the illuminated keyboard to present beautiful visual effects. However, although its flexibility/bendability/integral forming characteristics are particularly suitable for keyboard modules with complex circuit layouts, its irregular appearance will increase manufacturing costs.

The rigid material circuit board structure is to weld a flexible circuit strip to a flexible circuit board or a rigid circuit board with light sources. However, the welding portions between the flexible circuit strip and the flexible circuit board are exposed to the outside, and welding portions are likely to be broken under the influence of external forces, or are affected by static electricity and hinder the operation of the flexible circuit strip. In addition, if the flexible circuit strip is welded on a rigid circuit board, the size of the flexible circuit strip will be significantly increased, which affects the overall volume of the illuminated keyboard.

Accordingly, how to provide a backlight module to solve the aforementioned problems becomes an important issue to be solved by those in the industry.

SUMMARY

An aspect of the disclosure is to provide a backlight module that can efficiently solve the aforementioned problems.

According to an embodiment of the disclosure, a backlight module includes a light-shielding sheet, a light guide plate, a reflective sheet, a main circuit board, a light-emitting unit, a flexible circuit board, and an electrical connector. The light-shielding sheet has a light exit area. The light guide plate is disposed under the light-shielding sheet and has a slot hole and a through hole. The reflective sheet is disposed under the light guide plate and includes a protrusion and an opening. The protrusion protrudes into the through hole. The main circuit board is disposed under the reflective sheet. The light-emitting unit is disposed on the main circuit board and passes through the opening to be accommodated in the slot hole. The light-emitting unit is configured to emit light toward the light guide plate. The light reaches the light exit area through the light guide plate. The flexible circuit board is located under the reflective sheet and is configured to receive external power. The electrical connector is electrically connected to the flexible circuit board and the main circuit board, and is aligned with the through hole or further protrudes into the through hole.

In an embodiment of the disclosure, the backlight module further includes an adhesive layer. The adhesive layer is adhered between the reflective sheet and the main circuit board and covers the electrical connector.

According to an embodiment of the disclosure, an illuminated keyboard includes a keyswitch, a light-shielding sheet, a light guide plate, a reflective sheet, a main circuit board, a light-emitting unit, a flexible circuit board, and an electrical connector. The keyswitch has a light-transmissive character area. The light-shielding sheet has a light exit area aligned with the light-transmissive character area. The light guide plate is disposed under the light-shielding sheet and has a slot hole and a through hole. The reflective sheet is disposed under the light guide plate and includes a protrusion and an opening. The protrusion protrudes into the through hole. The main circuit board is disposed under the reflective sheet. The light-emitting unit is disposed on the main circuit board and passes through the opening to be accommodated in the slot hole. The light-emitting unit is configured to emit light toward the light guide plate. The light reaches the light-transmissive character area sequentially through the light guide plate and the light exit area. The flexible circuit board is located under the reflective sheet and configured to receive external power. The electrical connector is electrically connected to the flexible circuit board and the main circuit board. The electrical connector is aligned with the through hole or further protrudes into the through hole.

In an embodiment of the disclosure, the illuminated keyboard further includes an adhesive layer. The adhesive layer is adhered between the reflective sheet and the main circuit board and covers the electrical connector.

In an embodiment of the disclosure, the adhesive layer entirely covers an upper surface of the electrical connector and extends outward from a peripheral edge of the upper surface.

In an embodiment of the disclosure, the adhesive layer is further adhered to the flexible circuit board.

In an embodiment of the disclosure, the adhesive layer is composed of pressure sensitive adhesive.

In an embodiment of the disclosure, the electrical connector is a thermo-compression bonding structure.

In an embodiment of the disclosure, the light-shielding sheet further has a non-light-transmissive area. The through hole is aligned with the non-light-transmissive area.

In an embodiment of the disclosure, the non-light-transmissive area corresponds to a central region of the keyswitch. The light-transmissive character area is adjacent to a peripheral region of the keyswitch.

Accordingly, in the backlight module of the present disclosure, since the electrical connector is directly covered by the adhesive layer adhered between the reflective sheet and the main circuit board for protection, it can have a lower profile than the conventional one dispensing glue on the electrical connector. On the other hand, the area of the reflective sheet corresponds to the through hole of the light guide plate can be free of holes. This can not only prevent the light in the light guide plate from leaking downward through the reflective sheet, but also prevent the light guide plate from scratching the main circuit board and the flexible circuit board under the reflective sheet. In addition, with the protrusion of the reflective sheet protruding into the through hole, the main circuit board and the flexible circuit board that are attached to the reflective sheet can be retained relative to the light guide plate in a horizontal direction. In the illuminated keyboard of the present disclosure, since the non-light-transmissive area of the light-shielding sheet corresponds to the central position of the keyswitch, the light transmitted from the light-transmissive character area of the keyswitch can have better uniformity.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
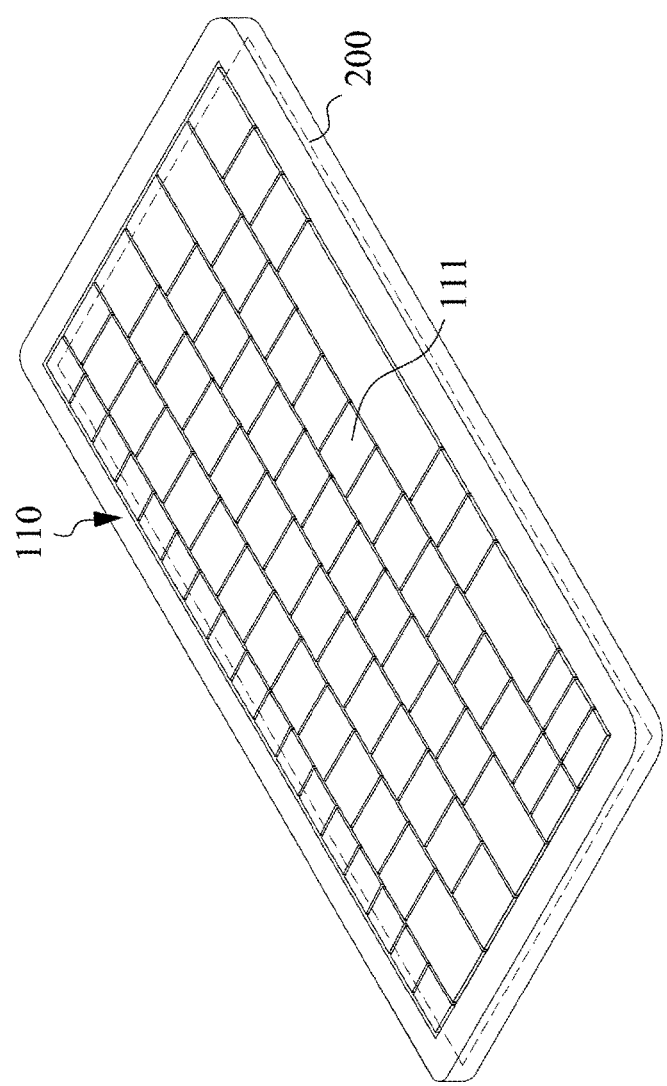
FIG. 1 is a perspective view of an illuminated keyboard according to an embodiment of the disclosure.

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Reference is made to FIG. 1. FIG. 1 is a perspective view of an illuminated keyboard 100 according to an embodiment of the disclosure. As shown in FIG. 1, the illuminated keyboard 100 is a keyboard that can emit light, is low-cost, has good structural strength and antistatic properties, and is thinner. The illuminated keyboard 100 includes a keyboard module 110 and a backlight module 200. The keyboard module 110 includes a plurality of keyswitches 111 for a user to press to trigger corresponding commands. The backlight module 200 is disposed under the keyboard module 110. The backlight module 200 is used to provide light with sufficient brightness and uniform distribution.

Figure 2:
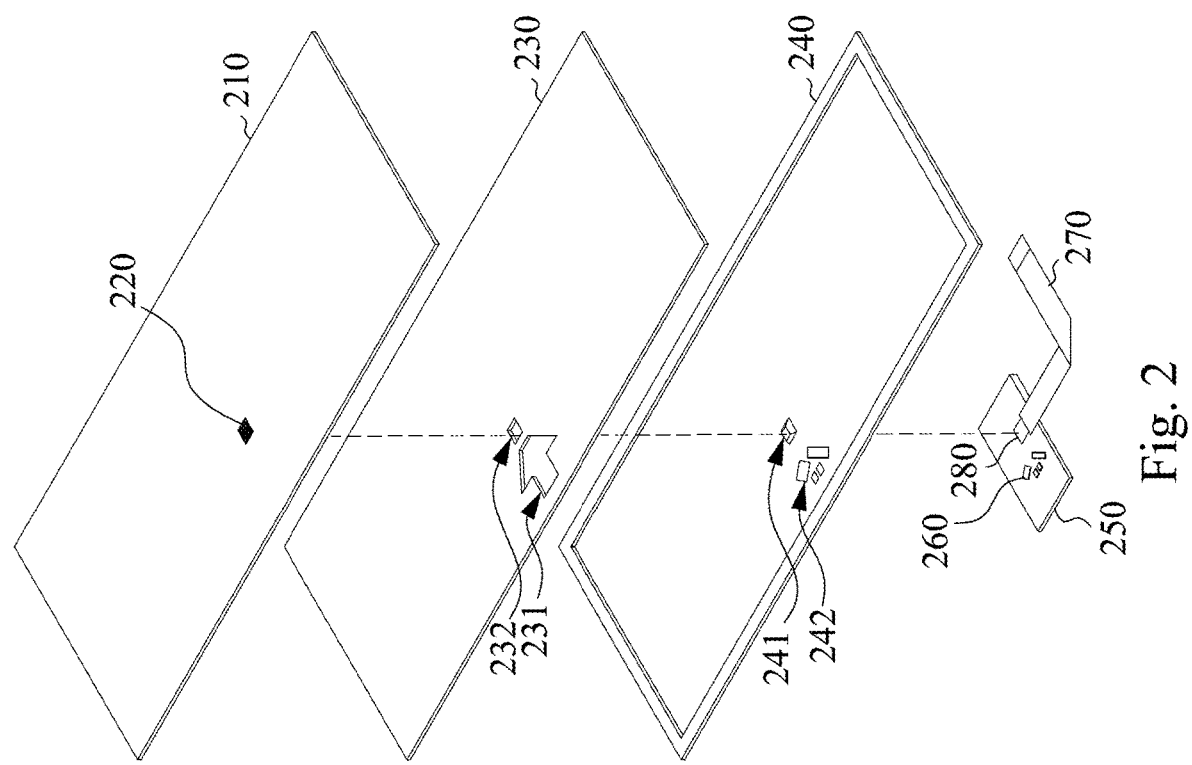
FIG. 2 is an exploded view of a backlight module according to an embodiment of the disclosure.
Figure 3:
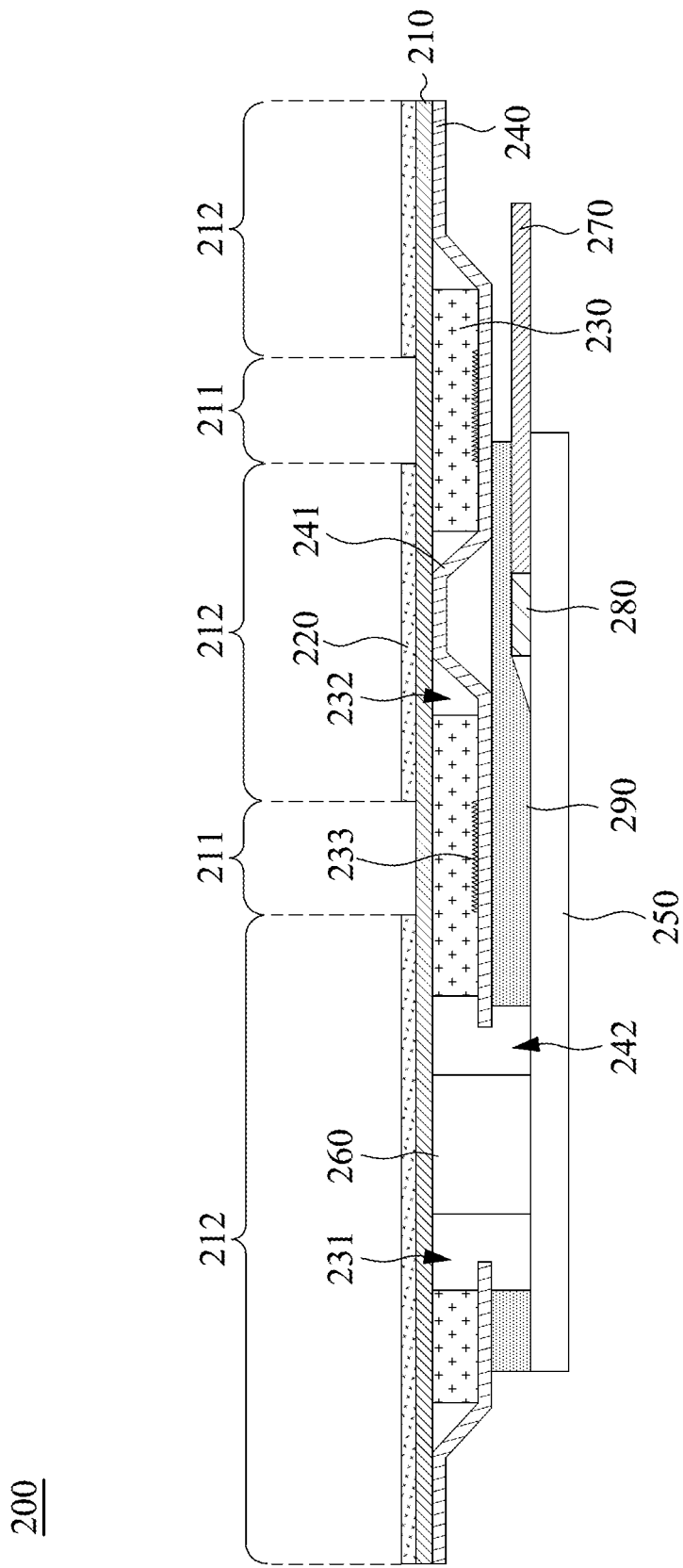
FIG. 3 is a cross-sectional view of the backlight module in FIG. 2 after being assembled.

Reference is made to FIGS. 2 and 3. FIG. 2 is an exploded view of the backlight module 200 according to an embodiment of the disclosure. FIG. 3 is a cross-sectional view of the backlight module 200 in FIG. 2 after being assembled. As shown in FIGS. 2 and 3, the backlight module 200 includes a light-shielding sheet 210, a light guide plate 230, a reflective sheet 240, a main circuit board 250, light-emitting units 260, a flexible circuit board 270, and an electrical connector 280. Structures and functions of these components and connection relationships among these components will be described in detail below.

As shown in FIG. 3, the light-shielding sheet 210 has light exit areas 211. The light guide plate 230 is disposed under the light-shielding sheet 210 and has a slot hole 231 and a through hole 232. The reflective sheet 240 is disposed under the light guide plate 230 and includes a protrusion 241 and an opening 242. The protrusion 241 protrudes into the through hole 232. The main circuit board 250 is disposed under the reflective sheet 240. The light-emitting units 260 are disposed on the main circuit board 250 and pass through the opening 242 of the reflective sheet 240 to be accommodated in the slot hole 231 of the light guide plate 230. The light-emitting units 260 are configured to emit light laterally toward the inner wall of the light guide plate 230 in the slot hole 231. The light entering the light guide plate 230 is repeatedly reflected in the light guide plate 230 to be transmitted in the horizontal dimension, and is reflected upward by the microstructures 233 formed on the lower surface of the light guide plate 230 to leave from the upper surface of the light guide plate 230 and then reaches the light-shielding sheet 210. The positions of the microstructures 233 are substantially located directly under the light exit areas 211. The flexible circuit board 270 is located under the reflective sheet 240 and is configured to receive external power. The electrical connector 280 is electrically connected to the flexible circuit board 270 and the main circuit board 250, and is aligned with the through hole 232. In some other embodiments, the electrical connector 280 further protrudes into the through hole 232, which is not shown here.

With the foregoing structural configurations, since the protrusion 241 of the reflective sheet 240 protrudes into the through hole 232, the reflective sheet 240 can be retained relative to the light guide plate 230 in horizontal directions (for example, X direction and Y direction). The main circuit board 250 and the flexible circuit board 270 that are attached to the reflective sheet 240 can also be retained, so that the product reliability of the backlight module 200 can be effectively improved. In addition, since the area of the reflective sheet 240 corresponds to the through hole 232 of the light guide plate 230 is only provided with the protrusion 241 without any hole, not only the light in the light guide plate 230 can be prevented from leaking downward through the reflective sheet 240, but also the main circuit board 250 and the flexible circuit board 270 under the reflective sheet 240 can be prevented from being scratched by the burrs of the light guide plate 230. Furthermore, the reflective sheet 240 with an isolation effect can also isolate the backlight module 200 from the static electricity on the system side and the heat generated by the operating chip, so as to further enhance the product reliability of the backlight module 200.

In some embodiments, the light-emitting units 260 are light-emitting diodes, but the disclosure is not limited in this regard.

In some embodiments, the electrical connector 280 is a thermo-compression bonding structure (e.g., hotbar). That is, the electrical connector 280 is formed by thermal welding and disposed on the main circuit board 250. In addition, as shown in FIG. 3, the backlight module 200 further includes an adhesive layer 290. The adhesive layer 290 is adhered between the reflective sheet 240 and the main circuit board 250 and covers the electrical connector 280. Specifically, the adhesive layer 290 entirely covers an upper surface of the electrical connector 280 (referring to FIG. 3) and extends outward from a peripheral edge of the upper surface. The adhesive layer 290 is further adhered to the flexible circuit board 270. On the other hand, the electrical connector 280 is surrounded by the adhesive layer 290, the main circuit board 250, and the flexible circuit board 270. In other words, the purpose of the adhesive layer 290 is not only to adhere the reflective sheet 240 and the main circuit board 250, but also to protect the electrical connector 280 from being short-circuited by external substances.

With the foregoing structural configurations, since the electrical connector 280 is directly covered by the adhesive layer 290 adhered between the reflective sheet 240 and the main circuit board 250 for protection, the backlight module 200 can have a lower profile than the conventional one dispensing glue on the electrical connector 280 for protection, and this is why the reflective sheet 240 does not need to be provided with holes for accommodating the glue. In addition, the approach of extending the adhesive layer 290 to cover the electrical connector 280 not only maintains the original product reliability of the backlight module 200, but also further improves the pull strength.

In some embodiments, the adhesive layer 290 is composed of pressure sensitive adhesive, but the disclosure is not limited in this regard.

In some embodiments, the main circuit board 250 is made of a rigid material (such as a PCB). The main circuit board 250 is used to obtain power from an external power source (not shown) via the flexible circuit board 270 and transmit the power to the light-emitting units 260 to make the light-emitting units 260 emit light. Since the main circuit board 250 is made of the rigid material, its manufacturing and assembly cost are cheaper than those of the flexible circuit board 270. Furthermore, since the main circuit board 250 and the flexible circuit board 270 have simple shapes (e.g., rectangular), the manufacturing cost can be lower compared with that of a conventional flexible material circuit board which is composed of a circuit board body and a flexible circuit strip integrally formed and having an irregular appearance.

As shown in FIGS. 2 and 3, the light-shielding sheet 210 is provided with a black-shielding material 220 thereon, so the light-shielding sheet 210 can be divided into the light exit areas 211 not covered by the black-shielding material 220 and non-light-transmissive areas 212 covered by the black-shielding material 220. In this way, the light transmitted from the light guide plate 230 will be shielded by the black-shielding material 220 and only be transmitted upward to the outside from the light exit areas 211. In addition, the through hole 232 is aligned with one of the non-light-transmissive areas 212. Therefore, the area of the light-shielding sheet 210 corresponds to the through hole 232 of the light guide plate 230 is also free of holes, so static electricity caused by friction with the iron parts of the keyboard module 110 can be isolated, and the area of the electrical connector 280 can be further protected.

In some embodiments, the black-shielding material 220 is, for example, a black printing tape or black ink, but the disclosure is not limited in this regard.

Figure 4:
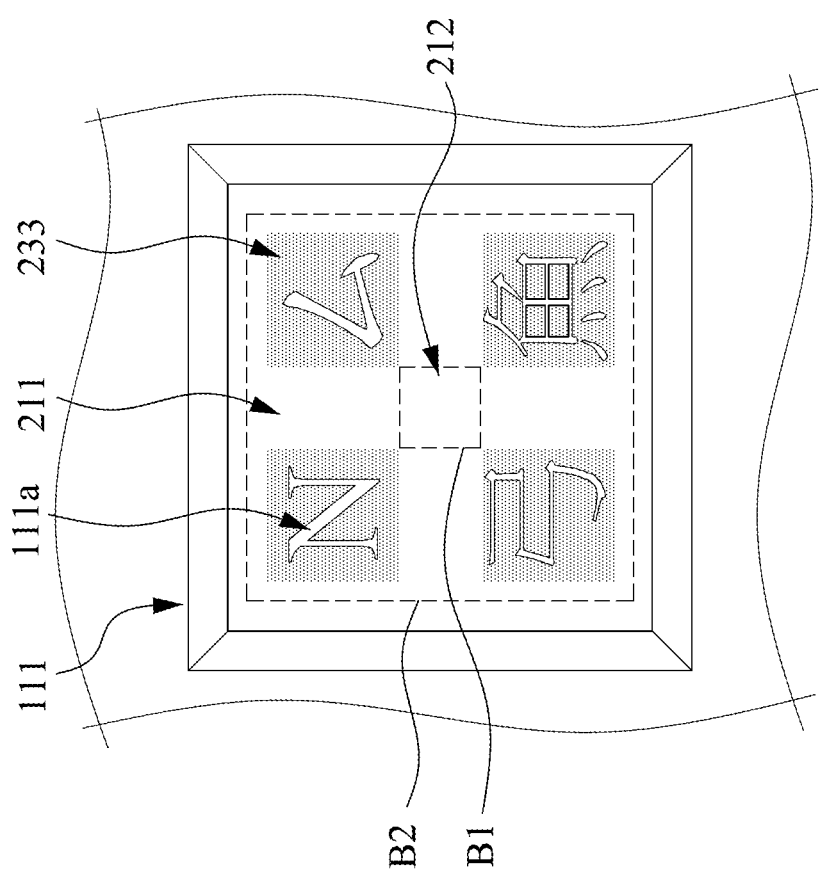
FIG. 4 is a partial top view of the illuminated keyboard in FIG. 1.

Reference is made to FIG. 4. FIG. 4 is a partial top view of the illuminated keyboard 100 in FIG. 1. As shown in FIG. 4, at least one of the keyswitches 111 has light-transmissive character areas 111a. The area between the dashed frames B1, B2 is one of the light exit areas 211 of the light-shielding sheet 210. The area within the dashed frame B1 and the area outside the dashed frame B2 are the non-light-transmissive areas 212 of the light-shielding sheet 210. The non-light-transmissive area 212 of the light-shielding sheet 210 within the dashed frame B1 corresponds to a central region of the keyswitch 111, and the light-transmissive character areas 111a are adjacent to a peripheral region of the keyswitch 111. The light-transmissive character areas 111a are respectively aligned with four corners of the light exit area 211. The light guide plate 230 is provided with the microstructures 233 correspondingly at the areas directly under the light-transmissive character areas 111a, so the light reflected upward by the microstructures 233 can be transmitted to the outside through the light-transmissive character areas 111a. The light guide plate 230 has the through hole 232 which may cause light leakage and deteriorate the luminance uniformity of the characters, but the design of the non-light-transmissive areas 212 can just shield the light and maintain a better luminance uniformity of the characters.

In some embodiments, the non-light-transmissive areas 212 of the light-shielding sheet 210 may correspond to the position under a blank key, but the disclosure is not limited in this regard.

According to the foregoing recitations of the embodiments of the disclosure, it can be seen that in the backlight module of the present disclosure, since the electrical connector is directly covered by the adhesive layer adhered between the reflective sheet and the main circuit board for protection, it can have a lower profile than the conventional one dispensing glue on the electrical connector. On the other hand, the area of the reflective sheet corresponds to the through hole of the light guide plate can be free of holes. This can not only prevent the light in the light guide plate from leaking downward through the reflective sheet, but also prevent the light guide plate from scratching the main circuit board and the flexible circuit board under the reflective sheet. In addition, with the protrusion of the reflective sheet protruding into the through hole, the main circuit board and the flexible circuit board that are attached to the reflective sheet can be retained relative to the light guide plate in a horizontal direction. In the illuminated keyboard of the present disclosure, since the non-light-transmissive area of the light-shielding sheet corresponds to the central position of the keyswitch, the light transmitted from the light-transmissive character area of the keyswitch can have better uniformity.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:
1. A backlight module, comprising:
   a light-shielding sheet having a light exit area;
   a light guide plate disposed under the light-shielding sheet and having a slot hole and a through hole;
   a reflective sheet disposed under the light guide plate and comprising a protrusion and an opening, the protrusion protruding into the through hole;
   a main circuit board disposed under the reflective sheet;
   a light-emitting unit disposed on the main circuit board and passing through the opening to be accommodated in the slot hole, the light-emitting unit being configured to emit light toward the light guide plate, the light reaching the light exit area through the light guide plate;

a flexible circuit board located under the reflective sheet and configured to receive external power; and an electrical connector electrically connected to the flexible circuit board and the main circuit board, the electrical connector being aligned with the through hole or further protruding into the through hole.

2. The backlight module of claim 1, further comprising an adhesive layer, the adhesive layer being adhered between the reflective sheet and the main circuit board and covering the electrical connector.

3. The backlight module of claim 2, wherein the adhesive layer entirely covers an upper surface of the electrical connector and extends outward from a peripheral edge of the upper surface.

4. The backlight module of claim 2, wherein the adhesive layer is further adhered to the flexible circuit board.

5. The backlight module of claim 2, wherein the adhesive layer is composed of pressure sensitive adhesive.

6. The backlight module of claim 1, wherein the electrical connector is a thermo-compression bonding structure.

7. The backlight module of claim 1, wherein the light-shielding sheet further has a non-light-transmissive area, and the through hole is aligned with the non-light-transmissive area.

8. An illuminated keyboard, comprising:
a keyswitch having a light-transmissive character area;
a light-shielding sheet having a light exit area aligned with the light-transmissive character area;
a light guide plate disposed under the light-shielding sheet and having a slot hole and a through hole;
a reflective sheet disposed under the light guide plate and comprising a protrusion and an opening, the protrusion protruding into the through hole;
a main circuit board disposed under the reflective sheet;
a light-emitting unit disposed on the main circuit board and passing through the opening to be accommodated in the slot hole, the light-emitting unit being configured to emit light toward the light guide plate, the light reaching the light-transmissive character area sequentially through the light guide plate and the light exit area;
a flexible circuit board located under the reflective sheet and configured to receive external power; and
an electrical connector electrically connected to the flexible circuit board and the main circuit board, the electrical connector being aligned with the through hole or further protruding into the through hole.

9. The illuminated keyboard of claim 8, further comprising an adhesive layer, the adhesive layer being adhered between the reflective sheet and the main circuit board and covering the electrical connector.

10. The illuminated keyboard of claim 9, wherein the adhesive layer entirely covers an upper surface of the electrical connector and extends outward from a peripheral edge of the upper surface.

11. The illuminated keyboard of claim 9, wherein the adhesive layer is further adhered to the flexible circuit board.

12. The illuminated keyboard of claim 9, wherein the adhesive layer is composed of pressure sensitive adhesive.

13. The illuminated keyboard of claim 8, wherein the electrical connector is a thermo-compression bonding structure.

14. The illuminated keyboard of claim 8, wherein the light-shielding sheet further has a non-light-transmissive area, and the through hole is aligned with the non-light-transmissive area.

15. The illuminated keyboard of claim 14, wherein the non-light-transmissive area corresponds to a central region of the keyswitch, and the light-transmissive character area is adjacent to a peripheral region of the keyswitch.

\* \* \* \* \*